United States Patent
Yokosawa et al.

(10) Patent No.: US 10,892,463 B2
(45) Date of Patent: Jan. 12, 2021

(54) SECONDARY BATTERY AND METHOD OF MANUFACTURING THE SAME

(71) Applicant: FDK CORPORATION, Tokyo (JP)

(72) Inventors: Tomomi Yokosawa, Tokyo (JP); Yusuke Fukuda, Tokyo (JP); Hiroyuki Shibaoka, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 16/575,364

(22) Filed: Sep. 18, 2019

(65) Prior Publication Data

US 2020/0099036 A1  Mar. 26, 2020

(30) Foreign Application Priority Data

Sep. 20, 2018 (JP) ................. 2018-176555

(51) Int. Cl.
*H01M 2/22* (2006.01)
*H01M 2/26* (2006.01)
*H01M 2/02* (2006.01)
*H01M 2/06* (2006.01)
*H01M 2/30* (2006.01)
*H01M 10/04* (2006.01)
(Continued)

(52) U.S. Cl.
CPC ............ *H01M 2/26* (2013.01); *H01M 2/022* (2013.01); *H01M 2/024* (2013.01); *H01M 2/06* (2013.01); *H01M 2/30* (2013.01); *H01M 10/0422* (2013.01); *H01M 2/0408* (2013.01); *H01M 2/202* (2013.01); *H01M 2/22* (2013.01); *H01M 2/24* (2013.01); *H01M 2/263* (2013.01); *H01M 10/286* (2013.01)

(58) Field of Classification Search
None
See application file for complete search history.

(56) References Cited

U.S. PATENT DOCUMENTS

2009/0233174 A1* 9/2009 Okabe ............... H01M 10/0431 429/223
2010/0112434 A1* 5/2010 Akou ................. H01M 10/052 429/174

FOREIGN PATENT DOCUMENTS

EP  3293797 A1  3/2018
EP  8355382 A1  8/2018
(Continued)

OTHER PUBLICATIONS

Extended European Search Report dated Jan. 16, 2020, received for corresponding European Application No. 19197759.4, 6 pages.

*Primary Examiner* — Jeremiah R Smith
(74) *Attorney, Agent, or Firm* — Kinney & Lange, P.A.

(57) ABSTRACT

A secondary battery includes a positive electrode current collector attached to an electrode group, a sealing body including a lid plate and a positive electrode terminal, and a current collecting lead interposed between the positive electrode current collector and the sealing body, and joined to the positive electrode current collector and the sealing body. The current collecting lead has a top wall located on a side of the sealing body, a bottom wall facing the top wall, and located on a side of the positive electrode current collector, and a pair of side walls and extending between a side edge of the top wall and a side edge of the bottom wall, and facing each other. The top wall includes faced parts and facing the bottom wall, and extension parts extending outward from the faced parts, and the extension parts are joined to the lid plate.

10 Claims, 6 Drawing Sheets

(51) Int. Cl.
    *H01M 2/04*     (2006.01)
    *H01M 2/20*     (2006.01)
    *H01M 2/24*     (2006.01)
    *H01M 10/28*     (2006.01)

(56) References Cited

FOREIGN PATENT DOCUMENTS

| | | | | |
|---|---|---|---|---|
| JP | 2004-235036 | * | 8/2004 | ............ H01M 2/26 |
| JP | 2018170140 A | | 11/2018 | |
| JP | 2019114472 A | | 7/2019 | |
| JP | 2019117690 A | | 7/2019 | |

* cited by examiner

SECONDARY BATTERY AND METHOD OF MANUFACTURING THE SAME

CROSS-REFERENCE TO RELATED APPLICATION(S)

This application claims priority to Japanese Application No. 2018-176555 filed on Sep. 20, 2018, the entire contents of which are incorporated by reference herein.

BACKGROUND

Technical Field

The present disclosure relates to a secondary battery and a method of manufacturing the secondary battery.

Description of the Related Art

Applications for secondary batteries capable of charging have been expanded, and batteries of a type capable of charging and discharging at a high rate have been developed. As one of such batteries, for example, a cylindrical alkaline secondary battery as described below is known.

In the cylindrical alkaline secondary battery, an electrode group is housed in a bottomed cylindrical outer can with an alkaline electrolyte, and is formed by an opening of the outer can being sealed by a sealing body including a positive electrode terminal.

The above-described electrode group is formed by winding in a spiral shape a positive electrode and a negative electrode stacked with a separator sandwiched therebetween, and has a substantially cylindrical shape as a whole. Now, the positive electrode and the negative electrode are disposed to be slightly deviated from each other in the direction along the axis of the electrode group during the winding operation, and a separator of a predetermined size is disposed at a predetermined position between the positive electrode and the negative electrode. Then, in this state, the positive electrode, the separator and the negative electrode are wound. As a result, the edge part of the positive electrode protrudes in a spiral from one end surface side of the electrode group, and the edge part of the negative electrode protrudes in a spiral from the other end surface side of the electrode group.

A positive electrode current collector formed of a metal plate is welded to the edge part of the protruding positive electrode, and a negative electrode current collector formed of a metal plate is welded to the edge part of the protruding negative electrode. Thereby, the positive electrode is electrically connected to the positive electrode current collector in a wide range, and the negative electrode is electrically connected to the negative electrode current collector in a wide range, so that the current collection efficiency is enhanced. As a result, charge and discharge can be performed at a high rate in the battery.

As an assembly procedure of this cylindrical alkaline secondary battery, for example, first, the electrode group is inserted into the outer can, and an inner surface of the bottom wall of the outer can and the negative electrode current collector are welded. As a result, the outer can, which also serves as a negative electrode terminal, and the negative electrode are electrically connected. Next, one end of a positive electrode ribbon formed of a thin metal plate is welded to a predetermined position of the positive electrode current collector. Further, the other end of the positive electrode ribbon is welded to a predetermined position of the sealing body. As a result, the positive electrode terminal and the positive electrode are electrically connected. Thereafter, the sealing body is attached to the upper end opening part of the outer can with an insulating gasket interposed therebetween, and the upper end opening part of the outer can is caulked to seal the outer can. Thus, the cylindrical alkaline secondary battery is formed.

As the positive electrode ribbon described above, a relatively long positive electrode ribbon is used to facilitate welding to the sealing body. In addition, when the sealing body is attached to the upper end opening part of the outer can, the positive electrode ribbon is housed so as to be bent between the sealing body and the electrode group in the outer can. Therefore, the relatively thin positive electrode ribbon is used so as to be easily bent.

By the way, in recent years, higher performance is desired for alkaline secondary batteries. For example, it is desirable to have the performance to output a large current efficiently and the performance to perform rapid charging. That is, it is desired to further improve the high-rate charge and discharge characteristics.

In order to improve the high-rate charge and discharge characteristics, it is necessary to reduce the internal resistance of the battery as much as possible. However, when the thin and long strip-shaped positive electrode ribbon as described above is used, the specific resistance of the positive electrode ribbon is high, and the positive electrode ribbon causes the internal resistance of the battery to be increased.

Therefore, in order to lower the internal resistance of a battery and obtain a battery excellent in high-rate charge and discharge characteristics, it has been practiced to adopt a current collecting lead which can shorten a current conduction path than the conventional one. As a battery including such a current collecting lead, for example, a battery as shown in Japanese Patent Laid-Open No. 2001-143684 is generally known.

For example, as shown in FIG. 1 of Japanese Patent Laid-Open No. 2001-143684, a current collecting lead is provided with a cylindrical main body part and a wing extending from the main body part. The current collecting lead is mounted with the main body part lying down on a current collector, and the wing is welded to the current collector. That is, the wing becomes a welded part with the current collector. Thus, the current collecting lead is welded on the current collector welded to an electrode group.

Thereafter, a sealing body is welded to the current collecting lead. Specifically, the sealing body is mounted on the current collecting lead, and in this state, the sealing body is pressed toward a side of the current collector. In the process of the pressing, a welding current is supplied, and the sealing body and the circumference wall of the main body part of the current collecting lead are resistance-welded. Thus, the current collecting lead is interposed between the current collector and the sealing body in a crushed and deformed state, and electrically connects the current collector and the sealing body.

Such a current collecting lead is thicker than a conventional positive electrode ribbon, and can connect between the current collector and the sealing body at a short distance. For this reason, the current conduction path in a battery can be made thick and short. As a result, the internal resistance of the battery can be reduced.

As described above, the battery adopting the current collecting lead has lower internal resistance compared to conventional batteries, thereby is excellent in high-rate charge and discharge characteristics.

By the way, in the above-described current collector, a burr-like protrusion is provided to be able to form a good connection part with the edge part of the positive electrode or the negative electrode protruding in a spiral from the end part of the electrode group. With respect to the burr-like protrusions, punching work is usually performed to the current collector to form a slit, and the burr formed at the edge part of the slit is used.

In the manufacturing process of the battery as described above, when the current collecting lead is welded to the current collector, if a welded part of the current collecting lead, that is, the wing is positioned on the slit of the current collector, welding failure occurs and the yield of the battery is reduced. For this reason, in order to prevent the wing of the current collecting lead from overlapping with the slit of the current collector, work is necessary to align the current collecting lead at a predetermined position. However, when such alignment work is performed, the production efficiency of the battery is reduced, therefore, it is desirable to omit the work of aligning the current collecting lead.

SUMMARY

According to the present disclosure, there is provided a secondary battery that includes an outer can having an opening, a sealing body sealing the opening of the outer can, the sealing body including a lid plate arranged at the opening and a terminal of one electrode attached to the lid plate, an electrode group formed by stacking the one electrode and the other electrode via a separator, the electrode group being housed with an electrolyte inside the outer can, a current collector joined to the one electrode of the electrode group, and a current collecting lead interposed between the sealing body and the current collector and joined to the sealing body and the current collector to electrically connect the current collector and the sealing body, in which the current collecting lead has a top wall located on a side of the sealing body, a bottom wall facing the top wall and located on a side of the current collector, and a pair of side walls extending between a side edge of the top wall and a side edge of the bottom wall, and facing each other, and the top wall includes a faced part facing the bottom wall, and an extension part extending outward from the faced part, the extension part being joined to the lid plate.

BRIEF DESCRIPTION OF THE DRAWINGS

The present disclosure will become more fully understood from the detailed description given hereinafter and the accompanying drawings which are given by way of illustration only, and thus, are not limitative of the present disclosure, and wherein.

DETAILED DESCRIPTION

As a secondary battery including a current collecting lead according to the present disclosure, a 4/3 FA sized cylindrical nickel-hydrogen secondary battery (hereinafter referred to as a battery) 1 will be described below as an example with reference to the drawings.

The battery 1 includes an outer can 2 having a bottomed cylindrical shape with an upper end open, the outer can 2 having conductivity, and a bottom wall thereof functions as a negative electrode terminal. In the outer can 2, an electrode group 4 is housed together with a predetermined amount of alkaline electrolyte (which is not shown).

Figure 1:
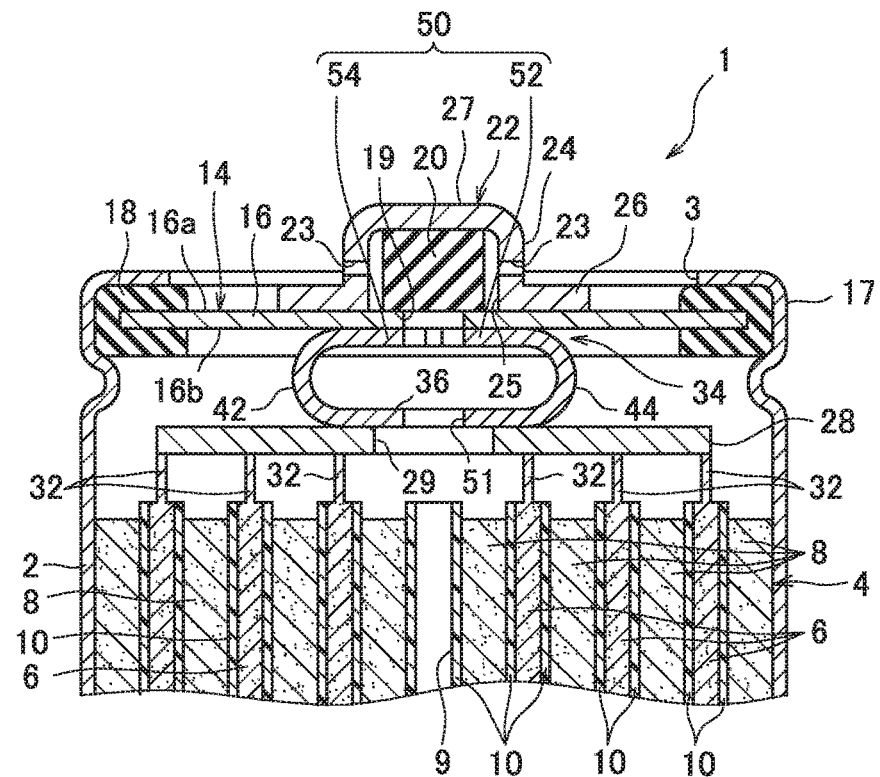
FIG. 1 is a cross-sectional view showing a cylindrical nickel-hydrogen secondary battery according to the present disclosure.

As shown in FIG. 1, an opening 3 of the outer can 2 is closed by a sealing body 14. The sealing body 14 includes a conductive disk-shaped lid plate 16, a valve body 20 arranged on the lid plate 16, and a positive electrode terminal 22 similarly arranged on the lid plate 16.

A ring-shaped insulating gasket 18 is disposed on the outer periphery of the lid plate 16 to surround the lid plate 16. The insulating gasket 18 and the lid plate 16 are fixed to an opening edge part 17 of the outer can 2 by caulking the opening edge part 17 of the outer can 2. That is, the lid plate 16 and the insulating gasket 18 cooperate with each other to seal the opening 3 of the outer can 2.

Here, the lid plate 16 has an exhaust hole 19 at the center, and a rubber valve body 20 is disposed on an outer surface 16a of the lid plate 16 so as to close the exhaust hole 19.

Further, the positive electrode terminal 22 is electrically connected on the outer surface 16a of the lid plate 16 to cover the valve body 20.

The positive electrode terminal 22 includes a cylindrical circumference wall 24, an opening 25 positioned at one end of the circumference wall 24, a flange 26 provided at the periphery of the opening 25, and an end wall 27 positioned at the other end opposite to the opening 25. The positive electrode terminal 22 presses the valve body 20 toward the lid plate 16. The positive electrode terminal 22 also has a gas venting hole 23 in the circumference wall 24.

At normal times, the exhaust hole 19 is airtightly closed by the valve body 20. On the other hand, when a gas is generated inside the outer can 2 and the pressure of the gas increases, the valve body 20 is compressed by the pressure of the gas, and the exhaust hole 19 is opened. As a result, the gas is released from the inside of the outer can 2 through the exhaust hole 19 and the gas venting hole 23 of the positive electrode terminal 22 to the outside. That is, the exhaust hole 19, the valve body 20 and the gas venting hole 23 of the positive electrode terminal 22 form a safety valve for the battery 1.

The electrode group 4 includes a positive electrode 6, a negative electrode 8, and a separator 10, each having a strip shape, and these are wound in a spiral shape with the separator 10 sandwiched between the positive electrode 6 and the negative electrode 8. That is, the positive electrode 6 and the negative electrode 8 are stacked each other via the separator 10. Such an electrode group 4 has a cylindrical shape as a whole.

In the electrode group 4, the edge part of the positive electrode 6 is spirally exposed from one end surface, and the edge part of the negative electrode 8 is spirally exposed from the other end surface. Here, assuming that the edge part of the exposed positive electrode 6 is a positive electrode connection edge part 32, and the edge part of the exposed negative electrode 8 is a negative electrode connection edge part (which is not shown). At the exposed positive electrode connection edge part 32 and the negative electrode connection edge part, a positive electrode current collector 28 described later and a negative electrode current collector (which is not shown) are welded, respectively.

The negative electrode 8 has a strip-shaped conductive negative electrode core body, and the negative electrode mixture is held on the negative electrode core body.

The negative electrode core body is a strip-shaped metal material, and a large number of through holes (which are not shown) penetrating in the thickness direction are provided. As such a negative electrode core body, for example, a punching metal sheet can be used.

The negative electrode mixture is not only filled in the through holes of the negative electrode core body, but also held in layers on both surfaces of the negative electrode core body.

The negative electrode mixture contains particles of a hydrogen storage alloy, a conductive material, a binder, and the like. Here, the hydrogen storage alloy is an alloy capable of storing and releasing hydrogen which is a negative electrode active material, and the hydrogen storage alloy generally used in a nickel-hydrogen secondary battery is suitably used. The above-described binder functions to bind the particles of the hydrogen storage alloy and the conductive material to each other and to bind the negative electrode mixture to the negative electrode core body. Here, as the conductive material, those generally used in nickel-hydrogen secondary batteries are suitably used. Further, although the binder is not particularly limited if it is generally used for the negative electrode of a nickel-hydrogen secondary battery, for example, a resin-based material is used, and specifically, hydrophilic or hydrophobic polymers, and resin-based materials such as carboxymethyl cellulose can be used.

The negative electrode 8 can be manufactured, for example, as follows.

First, a hydrogen storage alloy powder which is an aggregate of hydrogen storage alloy particles, a conductive material, a binder and water are kneaded to prepare a paste of a negative electrode mixture. The obtained paste of the negative electrode mixture is applied to the negative electrode core body and dried. After drying, the negative electrode core body on which the negative electrode mixture containing the hydrogen storage alloy particles and the like is attached is subjected to rolling and cutting. Thereby, an intermediate product of the negative electrode is obtained. The intermediate product of the negative electrode has a rectangular shape as a whole. Then, removal of the negative electrode mixture is performed from a predetermined edge part to be the negative electrode connection edge part in the intermediate product of the negative electrode. Thereby, the predetermined edge part is the negative electrode connection edge part in which the negative electrode core body is exposed. Thus, the negative electrode 8 having the negative electrode connection edge part is obtained. Here, the method of removing the negative electrode mixture is not particularly limited, but for example, removal by applying ultrasonic vibration is suitably performed. In the region other than the negative electrode connection edge part, the negative electrode mixture is still held.

Next, the positive electrode 6 will be described.

The positive electrode 6 includes a conductive positive electrode substrate and a positive electrode mixture held on the positive electrode substrate. Specifically, the positive electrode substrate has a porous structure having a large number of pores, and the positive electrode mixture is held in the above-described pores and on the surface of the positive electrode substrate.

As the positive electrode substrate, for example, foamed nickel can be used.

The positive electrode mixture contains nickel hydroxide particles as positive electrode active material particles, a cobalt compound as a conductive material, a binder, and the like. The above-described binder functions to bind the nickel hydroxide particles and the conductive material to each other and to bind the nickel hydroxide particles and the conductive material to the positive electrode substrate. Here, the binder is not particularly limited if it is generally used for the positive electrode of a nickel-hydrogen secondary battery, but for example, a resin-based material can be used, and specifically, resin-based materials such as carboxymethyl cellulose, methyl cellulose, PTFE (polytetrafluoroethylene) dispersion, HPC (hydroxypropyl cellulose) dispersion, and the like can be used.

The positive electrode 6 can be manufactured, for example, as follows.

First, a positive electrode mixture slurry including a positive electrode active material powder which is an aggregate of positive electrode active material particles (nickel hydroxide particles), a conductive material, water and a binder is prepared. The obtained positive electrode mixture slurry is, for example, filled in foamed nickel and dried. Thereafter, the foamed nickel filled with the nickel hydroxide particles and the like is subjected to rolling and cutting. Thereby, an intermediate product of the positive electrode is obtained. The intermediate product of this positive electrode has a rectangular shape as a whole. Then, the positive electrode mixture is removed from a predetermined edge part to be the positive electrode connection edge part 32 in the intermediate product of the positive electrode, and the positive electrode substrate is exposed. Then, the edge part from which the positive electrode mixture has been removed is compressed in the thickness direction of the intermediate product of the positive electrode to form the positive electrode connection edge part 32. Compression processing in this way causes the positive electrode substrate to be in a dense state, so that the positive electrode connection edge part 32 is easy to weld. In addition, joining a thin plate of Ni plated steel to the positive electrode connection edge part 32 may make it easier to weld the positive electrode connection edge part 32. In this way, the positive electrode 6 having the positive electrode connection edge part 32 is obtained. Here, the method of removing the positive electrode mixture is not particularly limited, but for example, a method of removing by applying ultrasonic vibration is suitably used. The region other than the positive electrode connection edge part 32 is still filled with the positive electrode mixture.

Next, as the separator 10, for example, a polyamide fiber non-woven fabric to which a hydrophilic functional group is imparted, or a polyolefin fiber non-woven fabric such as polyethylene or polypropylene to which a hydrophilic functional group is imparted can be used.

The positive electrode 6 and the negative electrode 8 manufactured as described above are wound in a spiral shape with the above-described separator 10 interposed therebetween, thereby the electrode group 4 is formed. Specifically, during winding, the positive electrode 6 and the negative electrode 8 are disposed to be slightly deviated from each other in the direction along the axial direction of the electrode group 4, and the separator 10 of a predetermined size is disposed at a predetermined position between the positive electrode 6 and the negative electrode 8. In this state, the winding operation is performed. As a result, a cylindrical electrode group 4 is obtained. As for an aspect of the obtained electrode group 4, in one end side of the electrode group 4, the positive electrode connection edge part 32 of the positive electrode 6 protrudes from the adjacent negative electrode 8 via the separator 10. In the other end side of the electrode group 4, the negative electrode connection edge part of the negative electrode 8 protrudes from the adjacent positive electrode 6 via the separator 10.

The electrode group 4 is formed by winding the positive electrode 6, the negative electrode 8 and the separator 10 described above with a winding core having a predetermined outer diameter dimension, and after the winding operation, the winding core is extracted, thereby, in the center part of the electrode group 4, a center through hole 9 penetrating the center part is formed.

As described above, the electrode group 4 has a cylindrical shape having the center through hole 9 as a whole. Here, dimension of each part of the electrode group 4 can be set to an appropriate value, and as an example, an outer diameter of 17.0 mm, a height of 61.5 mm and an inner diameter of the center through hole of 3.0 mm can be exemplified.

In the electrode group 4 described above, the positive electrode current collector 28 is connected to the positive electrode connection edge part 32 forming one end part of the cylindrical shape of the electrode group 4, and the negative electrode current collector is connected to the negative electrode connection edge part forming the other end part of the cylindrical shape of the electrode group 4.

The above-mentioned negative electrode current collector is not particularly limited, and for example, it is preferable to use a disk-shaped metal plate conventionally used. The prepared negative electrode current collector is welded to the negative electrode connection edge part of the other end side of the electrode group 4. Here, the material of the negative electrode current collector is not particularly limited, but a Ni-plated steel plate in which a thin plate of steel corresponding to a so-called SPCC (cold-rolled steel plate) is Ni-plated to a thickness of 2 μm can be exemplified as a preferred material. In addition, dimension of each part of the negative electrode current collector can be set to an appropriate value, and as an example, a diameter of 16.0 mm, a thickness of 0.4 mm can be exemplified.

Next, the positive electrode current collector 28 will be described.

The positive electrode current collector 28 is a plate-like body formed of a conductive material, and the shape in a plan view is not particularly limited, and any shape such as a disk shape or a polygonal shape can be adopted. Further, the size of the positive electrode current collector 28 is set to a size smaller than the outer diameter dimension of the electrode group 4 and capable of covering the positive electrode connection edge part 32 of the positive electrode 6 protruding from one end side of the electrode group 4.

Figure 2:
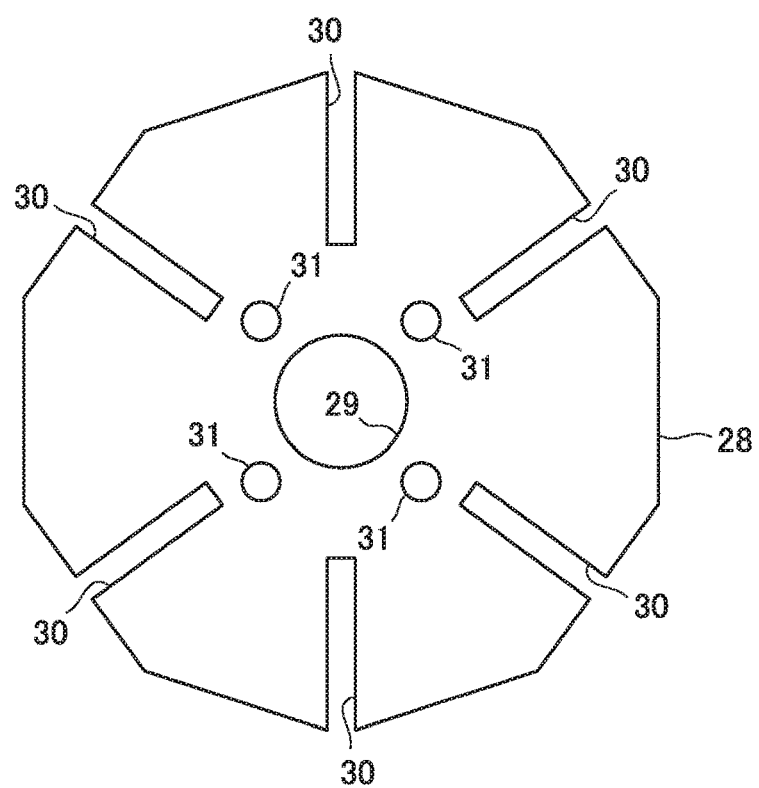
FIG. 2 is a plan view showing a positive electrode current collector.

In the present embodiment, as shown in FIG. 2, a plate material having a decagon shape in a plan view is used. Specifically, the positive electrode current collector 28 is a decagon-shaped thin plate as a whole, and includes a circular current collector center through hole 29 at the center and six slits 30 radially extending to surround the current collector center through hole 29. It is preferable that the slits 30 are formed by punching work, which produces a protrusion (burr) extending downward (on a side of the electrode group 4) at the portion of the edge of the slits 30. Further, it is preferable to provide a current collector protrusion 31 protruding to the side opposite to the electrode group 4 by punch press processing, at a predetermined position around the current collector center through hole 29. It is preferable that the current collector protrusion 31 is formed at a position avoiding the current collector center through hole 29 and the slit 30. In addition, the number of the current collector protrusions 31 is not particularly limited, but for example, it is preferable to provide four as shown in FIG. 2.

Here, the material of the positive electrode current collector 28 is not particularly limited, but a Ni-plated steel plate in which a thin plate of steel corresponding to a so-called SPCC (cold-rolled steel plate) is Ni-plated to a thickness of 2 μm can be exemplified as a preferred material. In addition, dimension of each part of the positive electrode current collector 28 can be set to an appropriate value, and as an example, a thickness of the positive electrode current collector 28 of 0.40 mm, a diameter of the circumscribed circle of the positive electrode current collector of 15.0 mm and a diameter of the current collector center through hole 29 is 3 mm can be exemplified.

In the battery 1, as shown in FIG. 1, the current collecting lead 34 is interposed between the positive electrode current collector 28 and the sealing body 14, and the current collecting lead 34 electrically connects the positive electrode current collector 28 connected to the positive electrode 6 of the electrode group 4 and the sealing body 14 having the positive electrode terminal 22.

The current collecting lead 34 includes, as is apparent from FIG. 1, a top wall 50 connected to the lid plate 16 of the sealing body 14, a bottom wall 36 connected to the positive electrode current collector 28, and a pair of side walls 42, 44 respectively present between edges 46, 48 on both sides of the top wall 50 and edges 38, 40 on both sides of the bottom wall 36.

Here, the material of the current collecting lead 34 is not particularly limited, but a Ni-plated steel plate in which a thin plate of steel corresponding to a so-called SPCC (cold-rolled steel plate) is Ni-plated to a thickness of 2 μm can be exemplified as a preferred material.

Figure 3:
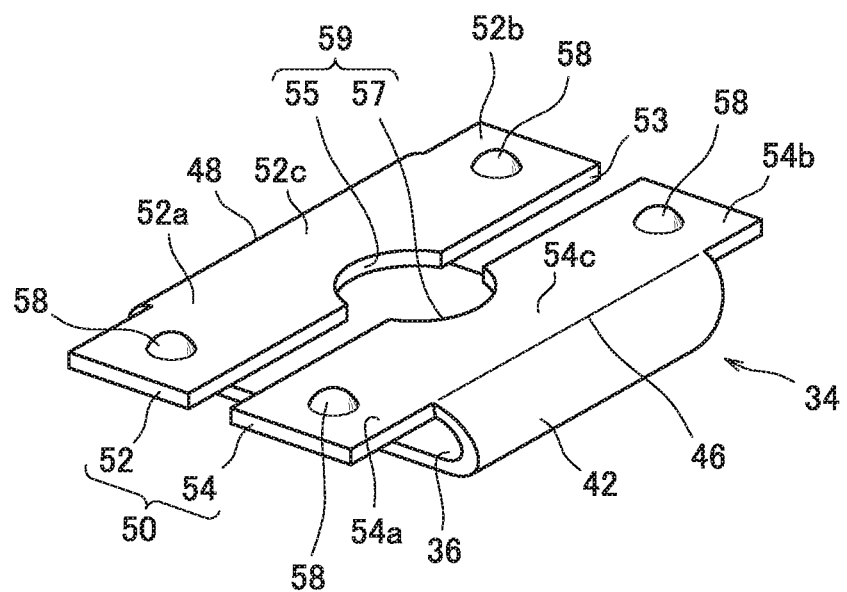
FIG. 3 is a perspective view showing a current collecting lead with a top wall side up.

The current collecting lead 34 will be described in detail with reference to FIG. 3 and FIG. 4. In FIG. 3, the top wall 50 is shown on the upper side and the bottom wall 36 is on the lower side, and in FIG. 4, the bottom wall 36 is shown on the upper side and the top wall 50 is on the lower side.

The top wall 50 is positioned in a position facing the bottom wall 36, as is apparent from FIG. 3, and has a rectangular shape as a whole. Specifically, the top wall 50 is divided by the top wall slit 53 extending along the long side direction at the center in the short side direction. That is, the top wall 50 includes one divided first half body part 52 and the other divided second half body part 54.

The first half body part 52 and the second half body part 54 includes, specifically, faced parts 52c and 54c facing the bottom wall 36, and extension parts 52a, 52b, 54a and 54b extending in the longitudinal direction of the top wall 50 from the faced parts 52c and 54c.

At the center of the faced part 52c of the first half body part 52, a semicircular first semicircular notch 55 facing the top wall slit 53 described above is provided. Further, a semicircular second semicircular notch 57 facing the above-described top wall slit 53 is provided at the center of the faced part 54c of the second half body part 54. The first semicircular notch 55 and the second semicircular notch 57 are positioned facing each other to form substantially a circular top wall through hole 59 as a whole. The top wall through hole 59 overlaps with the exhaust hole 19 of the lid plate 16 when the current collecting lead 34 is joined to the sealing body 14.

The extension parts 52a, 52b, 54a and 54b are provided with lead protrusions 58 protruding toward the side of the sealing body 14. The lead protrusion 58 is used as a portion to concentrate the welding current when resistance-welding is performed. That is, in the resistance-welding, a current flows in a state where the current collecting lead 34 is pressed toward the sealing body 14 and the lead protrusion 58 is pressed against the lid plate 16. In this case, the concentrated flow of the large current between the lead protrusion 58 and the contact point on the lid plate 16 causes this portion to generate heat and melt and deform. Thereby, a welded part is formed, and welding between the current collecting lead 34 and the sealing body 14 is performed.

The lead protrusion 58 is formed, for example, by punch press processing. The reference numeral 60 in FIG. 4 indicates a recess formed on the back side of the lead protrusion 58 when the lead protrusion 58 is provided on the extension parts 52a, 52b, 54a and 54b.

The extension parts 52a, 52b, 54a and 54b extend outward from the faced parts 52c and 54c facing the bottom wall 36 and avoid overlapping with the bottom wall 36. For this reason, when the current collecting lead 34 is resistance-welded to the sealing body 14, the electrode bar of the resistance-welding machine can be brought into contact with the extension parts 52a, 52b, 54a and 54b without interference with the bottom wall 36. In addition, the extending outward of the extension parts 52a, 52b, 54a and 54b from the faced parts 52c and 54c facing the bottom wall 36 functions to enhance the stability of the current collecting lead 34 when the current collecting lead 34 is joined to the sealing body 14.

Figure 4:
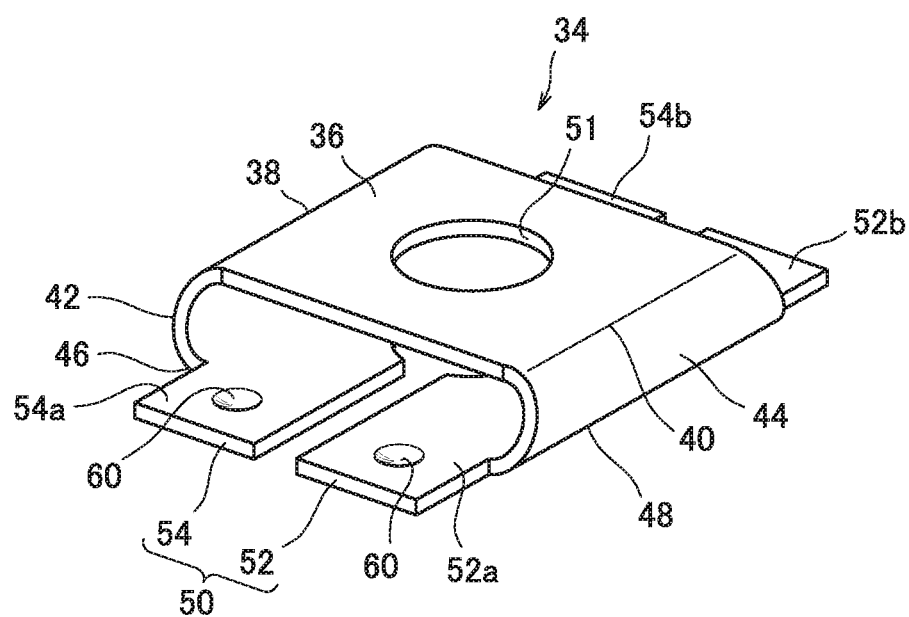
FIG. 4 is a perspective view showing a current collecting lead with a bottom wall side up.

Side walls 42 and 44 extend from the edges 46 and 48 on both sides of the top wall 50 to the edges 38 and 40 on both sides of the bottom wall 36, as shown in FIG. 3 and FIG. 4. The shape of the side walls 42 and 44 in a plan view is not particularly limited and, for example, any shape, such as rectangular shape or trapezoidal shape, can be employed.

Further, in order to promote the deformation of the current collecting lead 34 when a compressive load is applied, it is preferable that the side walls 42 and 44 have a curved shape that protrudes outward.

As shown in FIG. 4, the bottom wall 36 has a square shape as a whole in a plan view. A circular bottom wall through hole 51 is provided in the central portion of the bottom wall 36. The bottom wall through hole 51 is provided not to prevent the supply of the alkaline electrolyte to the electrode group 4 when the alkaline electrolyte is injected into the outer can 2. Here, when the above-described positive electrode current collector 28 and the current collecting lead 34 are combined, the current collector center through hole 29 and the bottom wall through hole 51 match each other.

The above-described current collecting lead 34 can be manufactured, for example, as follows.

Figure 5:
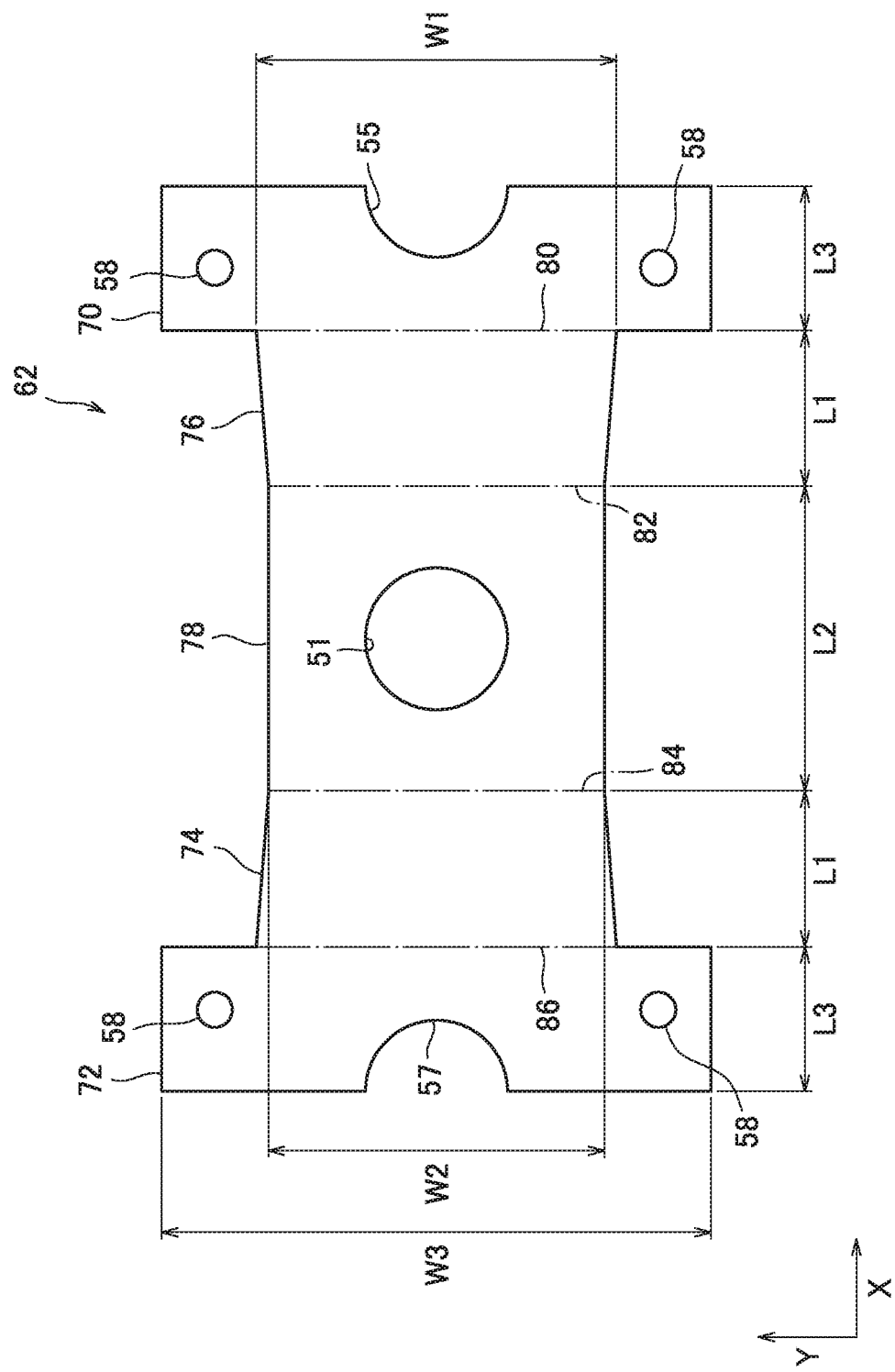
FIG. 5 is a plan view showing an intermediate product of the current collecting lead.

First, processing a thin metal plate prepares an intermediate product 62 of the current collecting lead 34 formed of a thin plate having a substantially H-shaped in a plan view, as shown in FIG. 5. In the intermediate product 62, the long-size portions positioned on both side parts are a first half body part schedule region 70 to be the first half body part 52 and a second half body part schedule region 72 to be the second half body part 54. The regions continuing to the inside of the first half body part schedule region 70 and the second half body part schedule region 72 are side wall schedule regions 74 and 76 to be the side walls 42 and 44.

A region sandwiched between the side wall schedule region 74 and the side wall schedule region 76 is a bottom wall schedule region 78 to be the bottom wall 36.

In the intermediate product 62, the lead protrusions 58 are provided at predetermined positions on both ends of the first half body part schedule region 70 and the second half body part schedule region 72 by punch press processing. The portion of the lead protrusion 58 is melted by resistance-welding to form the welded part.

Further, in the intermediate product 62, the first semicircular notch 55 and the second semicircular notch 57 are provided at the centers of the side edges of the first half body part schedule region 70 and the second half body part schedule region 72 by punching, and the bottom wall through hole 51 is provided by drilling at the center of the bottom wall schedule region 78.

In the intermediate product 62 obtained by applying the above-described pressing and punching, the current collecting lead 34 as shown in FIG. 3 and FIG. 4 is formed, by bending a portion of a bending imaginary line 80 assumed between the first half body part schedule region 70 and the side wall schedule region 76, a bending imaginary line 82 assumed between the side wall schedule region 76 and the bottom wall schedule region 78, a bending imaginary line 84 assumed between the bottom wall schedule region 78 and the side wall schedule region 74, and a bending imaginary line 86 assumed between the side wall schedule region 74 and the second half body part schedule region 72. It is preferable that the side wall schedule regions 74 and 76 are processed into a curved shape.

Now, dimension of each part of the intermediate product 62 can be set to an appropriate value, and an example of which is shown below.

First, a thickness of the intermediate product 62 is 0.30 mm. Further, for the dimension of each part shown in FIG. 5, a maximum side wall width W1 is 8.18 mm and a side wall height L1 is 3.46 mm. And, a length L2 in the direction shown by the arrow X of the bottom wall schedule region 78 is 6.4 mm, and a length L3 in the direction shown by the arrow X in the first half body part schedule region 70 and the second half body part schedule region 72 is 3.1 mm, a length W2 in the direction shown by the arrow Y of the bottom wall schedule region 78 is 7.5 mm and a length W3 in the direction shown by the arrow Y in the first half body part schedule region 70 and the second half body part schedule region 72 is 12.4 mm. Further, a radius of each of the bottom wall through hole 51, the first semicircular notch 55 and the second semicircular notch 57 is 1.5 mm.

In forming the current collecting lead 34, the top wall slit 53 does not have to be necessarily formed, and may have a shape in which the first half body part 52 and the second half body part 54 are connected.

Next, a method of manufacturing the battery 1 will be described.

First, the electrode group 4 as described above is prepared. Then, the negative electrode current collector is joined to the other end side of the electrode group 4.

Next, the positive electrode current collector 28 is mounted on one end side of the electrode group 4, and the positive electrode connection edge part 32 and the positive electrode current collector 28 of the electrode group 4 are resistance-welded. At this time, a current is concentrated at a portion where the burrs of the slits 30 of the positive electrode current collector 28 and the positive electrode connection edge part 32 contact to form a welded part, and the positive electrode connection edge part 32 and the positive electrode current collector 28 of the positive electrode 6 are welded. At this time, in the positive electrode current collector 28, the current collector protrusion 31 protrudes to the side opposite to the electrode group 4.

Figure 6:
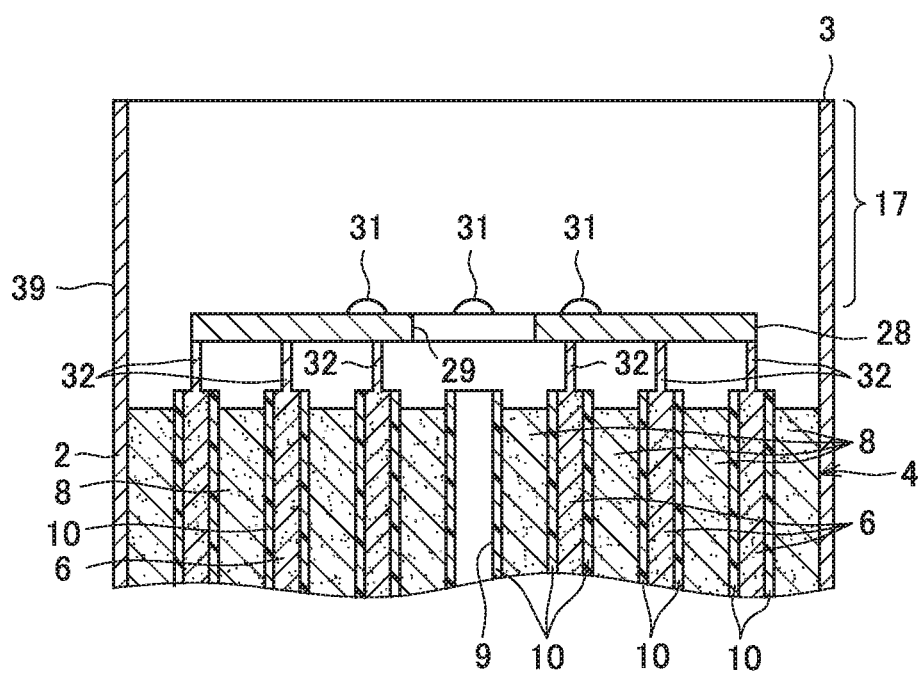
FIG. 6 is a cross-sectional view showing an electrode group housed in an outer can.

Thereafter, as shown in FIG. 6, the electrode group 4 including the negative electrode current collector and the positive electrode current collector 28 is housed in the outer can 2 and subsequently the negative electrode current collector is resistance-welded to the bottom wall of the outer can 2.

Next, a predetermined amount of alkaline electrolyte is injected into the outer can 2. The alkaline electrolyte injected into the outer can 2 is held on the electrode group 4, and most of the alkaline electrolyte is held on the separator 10. The alkaline electrolyte advances an electrochemical reaction (charge and discharge reaction) during charge and discharge between the positive electrode 6 and the negative electrode 8. As the alkaline electrolyte, it is preferable to use an aqueous solution containing at least one of KOH, NaOH and LiOH as a solute.

Figure 7:
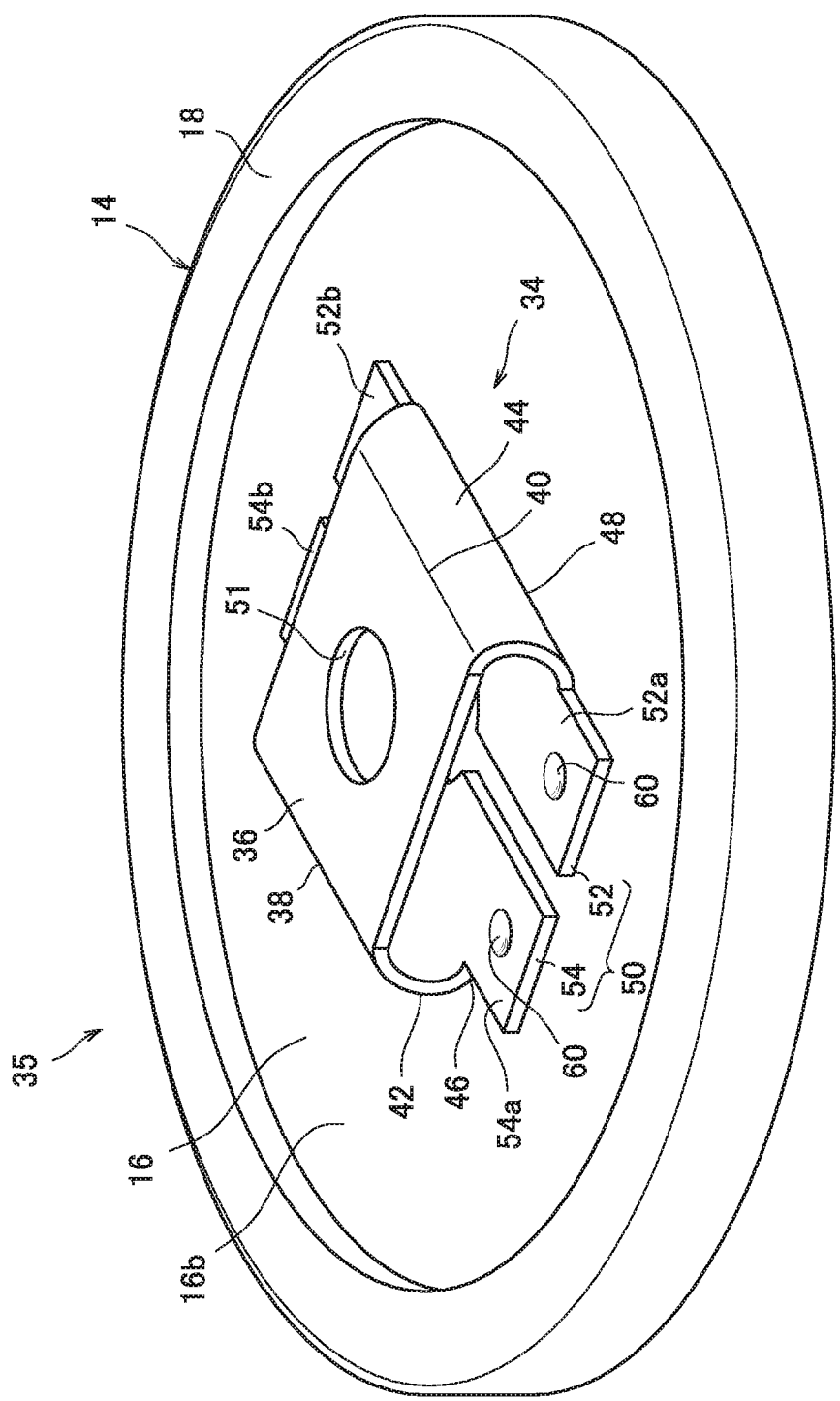
FIG. 7 is a perspective view showing a composite of a sealing body and the current collecting lead.

On the other hand, in a separate process, the inner surface 16b of the lid plate 16 of the sealing body 14 and the top wall 50 of the current collecting lead 34 are resistance-welded to form a composite 35 of the sealing body 14 and the current collecting lead 34. Specifically, as shown in FIG. 7, the sealing body 14 is disposed such that the inner surface 16b of the lid plate 16 is on the upper side, and the current collecting lead 34 is mounted on the inner surface 16b. Then, the extension parts 52a, 52b, 54a and 54b of the first half body part 52 and the second half body part 54 as the top wall 50 of the current collecting lead 34 are pressed against the inner surface 16b of the lid plate 16 to supply a welding current. At this time, a current is concentrated at a portion where the lead protrusions 58 of the extension parts 52a, 52b, 54a and 54b of the current collecting lead 34 and the inner surface 16b of the lid plate 16 of the sealing body 14 contact to form a welded part, thereby, the sealing body 14 and the current collecting lead 34 are welded, and the composite 35 of the sealing body 14 and the current collecting lead 34 is obtained.

Now, the ring-shaped insulating gasket 18 is fitted to the periphery of the lid plate 16 in the composite 35.

Figure 8:
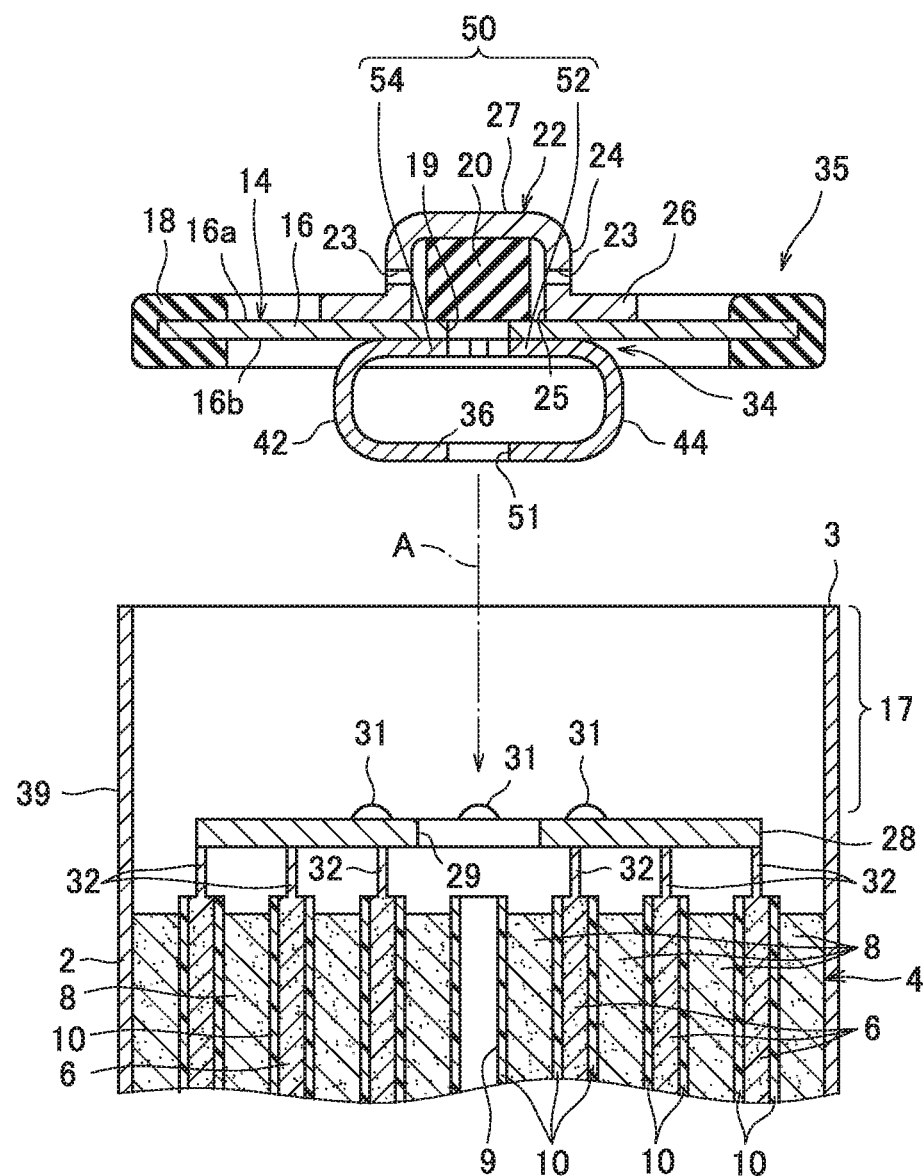
FIG. 8 is a cross-sectional view showing the outer can housing the electrode group and the composite to be combined with the outer can.

The composite 35 prepared as described above is inserted into the outer can 2 as shown by the arrow A in FIG. 8. Then, the composite 35 is disposed on the positive electrode current collector 28. Thereafter, while being pressurized in the direction in which the positive electrode terminal 22 of the composite 35 and the bottom (negative electrode terminal) of the outer can 2 approach each other, a current is supplied between the positive electrode terminal 22 and the negative electrode terminal to perform resistance-welding (projection welding). At this time, the current collector protrusion 31 of the positive electrode current collector 28 and the bottom wall 36 of the current collecting lead 34 contact, and a current is concentrated on the contact portion to form a welded part. As a result, the positive electrode current collector 28 and the bottom wall 36 of the current collecting lead 34 are welded. At this time, in the current collecting lead 34, the portions of the side walls 42 and 44 are deformed preferentially and slightly crushed. Thereby, the application of an excessive force to the electrode group 4 and the positive electrode current collector 28 is suppressed.

After the above welding is completed, the lid plate 16 of the sealing body 14 is positioned at the upper end opening part of the outer can 2 via the insulating gasket 18. Thereafter, the opening edge part 17 in a predetermined range from the opening 3 in the circumference wall 39 of the outer can 2 is caulked. Thereby, the sealing body 14 is fixed to the portion of the opening 3 of the outer can 2, and the opening 3 of the outer can 2 is sealed. Thus, the battery 1 as shown in FIG. 1 is obtained.

In the present disclosure, the extension parts 52a, 52b, 54a and 54b of the current collecting lead 34 are welded to the sealing body 14 in advance. That is, the directional extension parts 52a, 52b, 54a and 54b are present on a side of the sealing body 14. For this reason, it is not necessary to weld the extension parts 52a, 52b, 54a and 54b of the current collecting lead 34, which had to be aligned in the same direction with the positive electrode current collector 28, to the positive electrode current collector 28, and as conventional, in relation to the positive electrode current collector 28, the work of alignment of the extension parts 52a, 52b, 54a and 54b of the current collecting lead 34 to be a welded part in a predetermined position can be omitted. That is, when the composite 35 of the current collecting lead 34 and the sealing body 14 is fitted to the outer can 2 housing the electrode group 4, there is no need to align the direction of the extension part of the current collecting lead 34. Therefore, the production efficiency of the battery 1 can be improved. In addition, the battery 1 according to the present disclosure does not need to be aligned as described above, thereby the battery 1 is effective for automatic production of the battery 1.

The inner surface 16b of the lid plate 16 of the sealing body 14 is preferably a flat surface. Thus, when the inner surface 16b of the lid plate 16 is a flat surface, the lead protrusions 58 of the extension parts 52a, 52b, 54a and 54b of the current collecting lead 34, even if contact any portion of the inner surface 16b of the lid plate 16, can form a welded part.

Now, in a large battery in which the internal pressure of the battery is relatively high, for example, a battery having an outer diameter exceeds 19 mm, a bent part (step part) is provided at a predetermined position of the lid plate 16 to increase the strength of the lid plate 16 of the sealing body 14. For this reason, in order to make the inner surface 16b of the lid plate 16 flat in a large battery, it is preferred that the lid plate 16 is made of a stronger material, or a bent part (step part) is formed on the outer surface 16a side of the lid plate 16. On the other hand, in a small battery having an outer diameter of 19 mm or less, the internal pressure of the battery does not increase as much as a large battery, so that the strength can be maintained even when there is no bent part (step part) for reinforcement. Therefore, in a small battery having an outer diameter of 19 mm or less, it is relatively easy to make the inner surface of the lid plate 16 flat, so that the present disclosure can preferably adopt to a small battery having an outer diameter of 19 mm or less.

Further, in the present disclosure, it is preferable to provide the current collector protrusions 31 on the positive electrode current collector 28. In this case, a position where the current collector protrusion 31 abuts on the bottom wall 36 of the current collecting lead 34 is a welded part, so that there is no need to align the current collecting lead 34, and the work can be simplified.

The present disclosure is not limited to the above-described embodiment, and various modifications are possible. For example, in the above-described embodiment, the electrode on the side connected to the outer can is a negative electrode, and the electrode on the side connected to the sealing body is a positive electrode, but the present disclosure is not limited to this aspect. The electrode on the side connected to the outer can may be a positive electrode, and the electrode on the side connected to the sealing body may be a negative electrode.

Further, in the present disclosure, the type of battery is not limited to the nickel-hydrogen secondary battery, but may be a nickel-cadmium secondary battery, a lithium ion secondary battery, or the like.

Further, in the present disclosure, the size of the battery is not particularly limited, and may be FA size or AA size, or may be any other size.

Aspects of the Present Disclosure

A first aspect of the present disclosure is a secondary battery, that includes an outer can having an opening, a sealing body sealing the opening of the outer can, the sealing body including a lid plate arranged at the opening and a terminal of one electrode attached to the lid plate, an electrode group formed by stacking the one electrode and the other electrode via a separator, the electrode group being housed with an electrolyte inside the outer can, a current collector joined to the one electrode of the electrode group, and a current collecting lead interposed between the sealing body and the current collector and joined to the sealing body and the current collector to electrically connect the current collector and the sealing body, in which the current collecting lead has a top wall located on a side of the sealing body, a bottom wall facing the top wall and located on a side of the current collector, and a pair of side walls extending between a side edge of the top wall and a side edge of the bottom wall, and facing each other, and the top wall includes a faced part facing the bottom wall, and an extension part extending outward from the faced part, the extension part being joined to the lid plate.

A second aspect of the present disclosure is the secondary battery according to the first aspect of the present disclosure described above, in which the lid plate has a flat surface in contact with the current collecting lead.

A third aspect of the present disclosure is a secondary battery according to the first aspect or the second aspect of the present disclosure described above, in which the extension part has a welded part including a portion in which a lead protrusion protruding to the side of the sealing body is deformed by heat.

A fourth aspect of the present disclosure is a secondary battery according to any of the first aspect to third aspect of the present disclosure described above, in which the current collector has a welded part including a portion where a current collector protrusion protruding to a side of the current collecting lead is deformed by heat.

A fifth aspect of the present disclosure is the secondary battery according to the fourth aspect of the present disclosure described above, in which the current collector has a slit, and the current collector protrusion is positioned at a position avoiding the slit.

A sixth aspect of the present disclosure is a method of manufacturing a secondary battery, the method includes a composite preparation step of preparing a composite, formed by joining a current collecting lead to a sealing body, of the sealing body and the current collecting lead, the sealing body including a lid plate and a terminal of one electrode attached to an outer surface of the lid plate, the current collecting lead including a top wall, a bottom wall facing the top wall, and a pair of side walls extending between a side edge of the top wall and a side edge of the bottom wall, and facing each other, the top wall having a faced part facing the bottom wall, and an extension part extending outward from the faced part, in which an inner surface of the lid plate and the extension part of the current collecting lead are joined, an electrode group preparation step of joining a current collector to the electrode group formed by stacking one electrode and the other electrode via a separator, and preparing the electrode group joined with the current collector, an electrode group housing step of housing the electrode group prepared in the electrode group preparing step in an outer can having an opening, a joining step of arranging the composite prepared in the composite preparation step in the opening portion of the outer can, and joining between the current collector of the electrode group housed in the outer can and the bottom wall of the current collecting lead in the composite, and a sealing step of attaching the sealing body to the outer can, and sealing the opening of the outer can.

The present disclosure being thus described, it will be obvious that the same may be varied in many ways. Such variations are not to be regarded as a departure from the spirit and scope of the disclosure, and all such modifications as would be obvious to one skilled in the art are intended to be included within the scope of the following claims.

What is claimed is:

1. A secondary battery comprising:
   an outer can having an opening,
   a sealing body sealing the opening of the outer can, the sealing body including a lid plate arranged at the opening and a terminal of a first electrode attached to the lid plate;
   an electrode group formed by stacking the first electrode and a second electrode via a separator, the electrode group being housed with an electrolyte inside the outer can;
   a current collector joined to the first electrode of the electrode group; and
   a current collecting lead interposed between the sealing body and the current collector and joined to the sealing body and the current collector to electrically connect the current collector and the sealing body;
   wherein the current collecting lead has a top wall located on a side of the sealing body, a bottom wall facing the top wall and located on a side of the current collector, and a pair of side walls extending between a side edge of the top wall and a side edge of the bottom wall, and facing each other;
   wherein the top wall is divided by a top wall slit into a first body portion and a second body portion, the first body portion and the second body portion each comprising:
   a faced part facing the bottom wall,
   an extension part extending outward from the faced part, the extension part being joined to the lid plate; and
   an arced notch, the arced notch of the first body portion being aligned with the arced notch of the second body portion to form a substantially circular top wall through hole; and
   wherein the bottom wall includes a bottom wall through hole aligned with the top wall through hole.

2. The secondary battery according to claim 1, wherein the lid plate has a flat surface in contact with the current collecting lead.

3. The secondary battery according to claim 1, wherein the extension part has a welded part including a portion in which a lead protrusion protruding to the side of the sealing body is deformed by heat.

4. The secondary battery according to claim 1, wherein the current collector has a welded part including a portion in which a current collector protrusion protruding to a side of the current collecting lead is deformed by heat.

5. The secondary battery according to claim 4, wherein the current collector has a slit, and the current collector protrusion is positioned at a position avoiding the slit.

6. The secondary battery according to claim 1, wherein the lid plate is surrounded by a ring-shaped gasket and wherein the inner surface of the lid plate is a planar surface extending to the ring-shaped gasket.

7. The secondary battery according to claim 1, wherein the extension part and the faced part of the current collecting lead are disposed along a common plane.

8. A method of manufacturing a secondary battery, comprising:
a composite preparation step of preparing a composite, formed by joining a current collecting lead to a sealing body, of the sealing body and the current collecting lead, the sealing body including a lid plate and a terminal of a first electrode attached to an outer surface of the lid plate, the current collecting lead including a top wall, a bottom wall facing the top wall, and a pair of side walls extending between a side edge of the top wall and a side edge of the bottom wall, and facing each other, the top wall being divided by a slit into a first body portion and a second body portion each having a faced part facing the bottom wall, an extension part extending outward from the faced part, the extension part being joined to an inner surface of the lid plate, and an arced notch, the arced notch of the first body portion being aligned with the arced notch of the second body portion to form a substantially circular top wall through hole, wherein the bottom wall includes a bottom wall through hole aligned with the top wall through hole;
an electrode group preparation step of joining a current collector to the electrode group formed by stacking the first electrode and a second electrode via a separator, and preparing the electrode group joined with the current collector;
an electrode group housing step of housing the electrode group prepared in the electrode group preparing step in an outer can having an opening;
a joining step of arranging the composite prepared in the composite preparation step in the opening portion of the outer can, and joining between the current collector of the electrode group housed in the outer can and the bottom wall of the current collecting lead in the composite; and
a sealing step of attaching the sealing body to the outer can, and sealing the opening of the outer can.

9. The method of manufacturing a secondary battery according to claim 8, wherein the lid plate is surrounded by a ring-shaped gasket and wherein the inner surface of the lid plate is a planar surface extending to the ring-shaped gasket.

10. The method of manufacturing a secondary battery according to claim 8, wherein the extension part and the faced part of the current collecting lead are disposed along a common plane.

* * * * *